Dec. 5, 1967  T. D. COLE  3,356,780
FABRIC MAKING METHOD AND APPARATUS
Filed Aug. 7, 1964  5 Sheets-Sheet 2
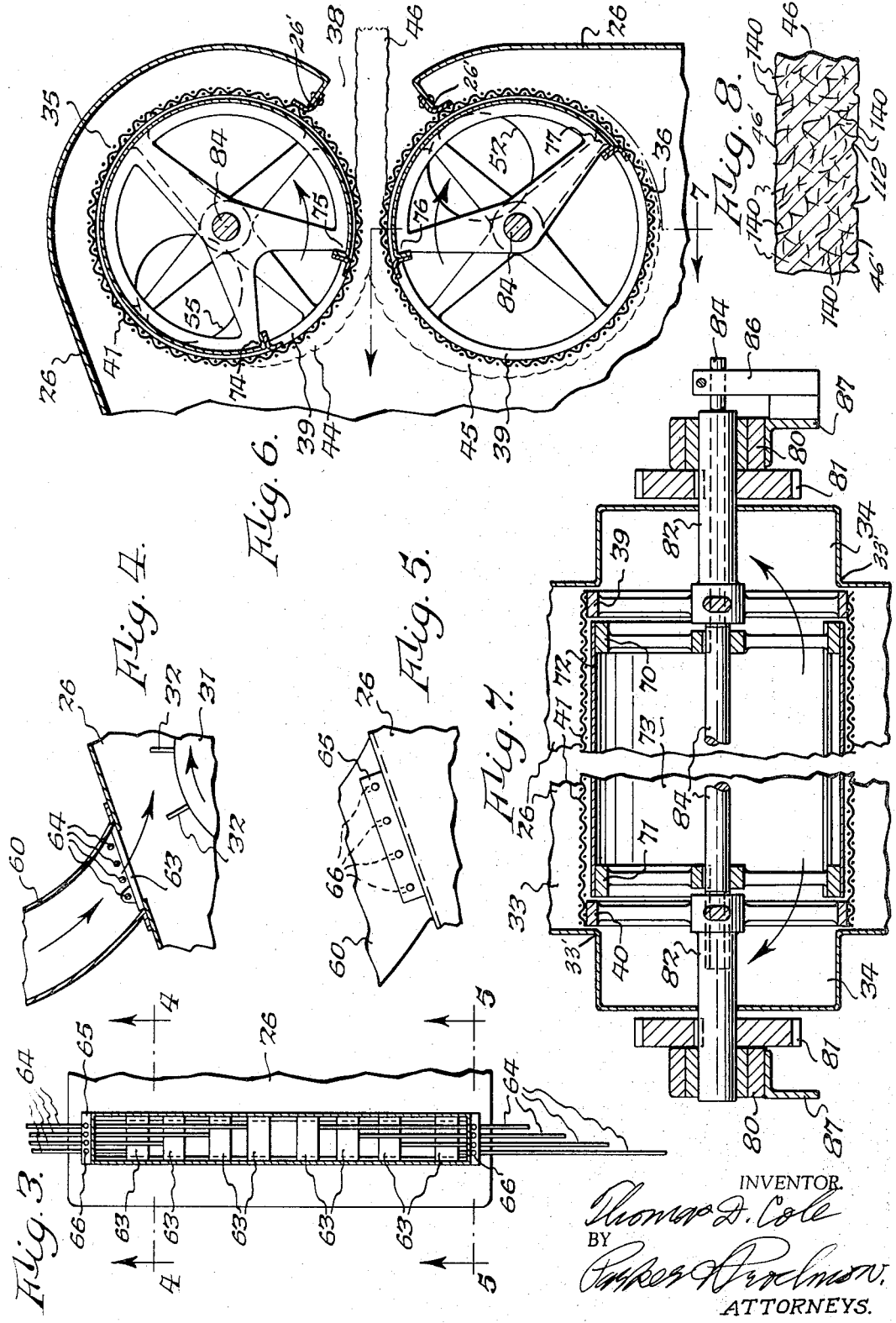
INVENTOR.
Thomas D. Cole
BY
Parker & Pryelmon
ATTORNEYS.

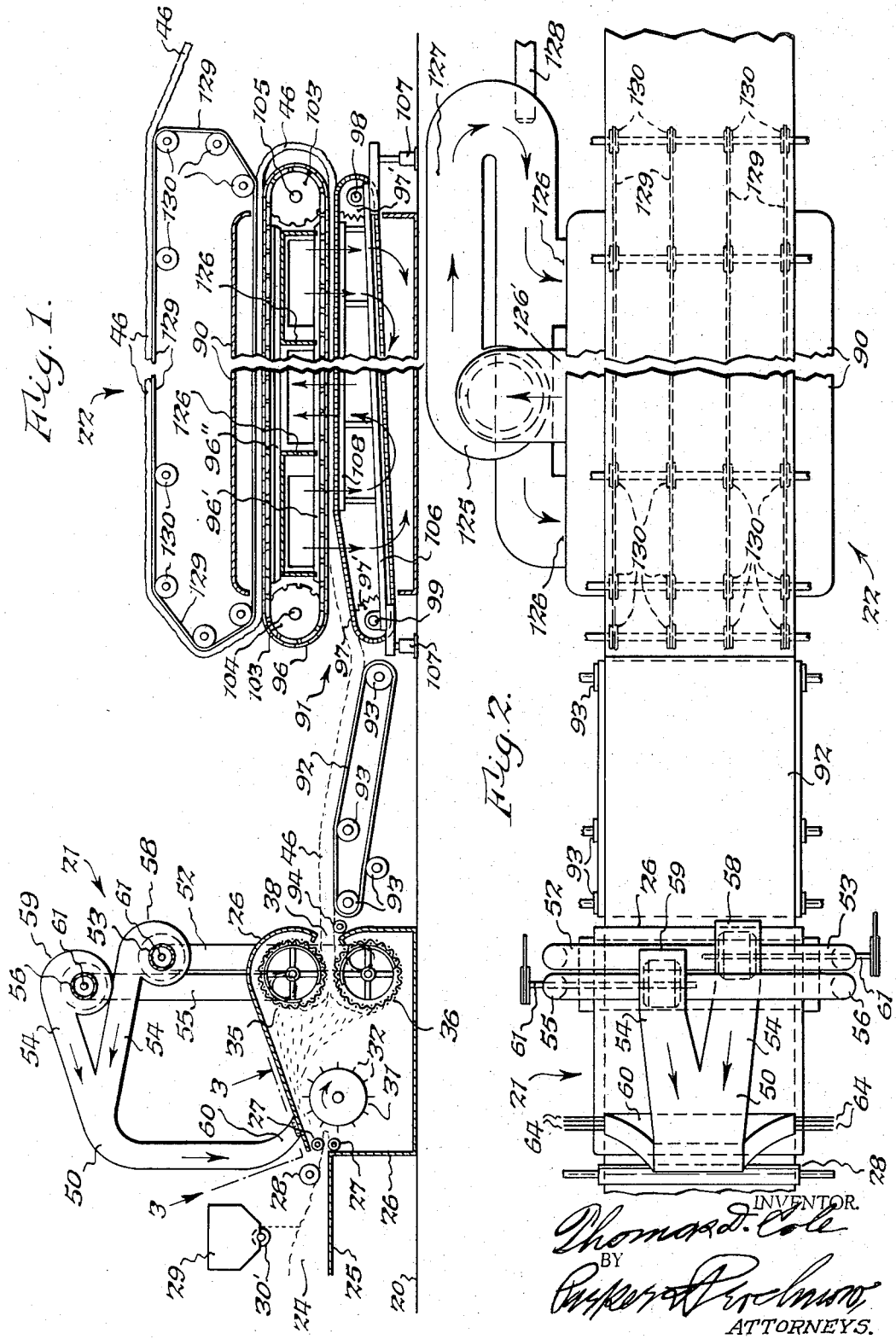

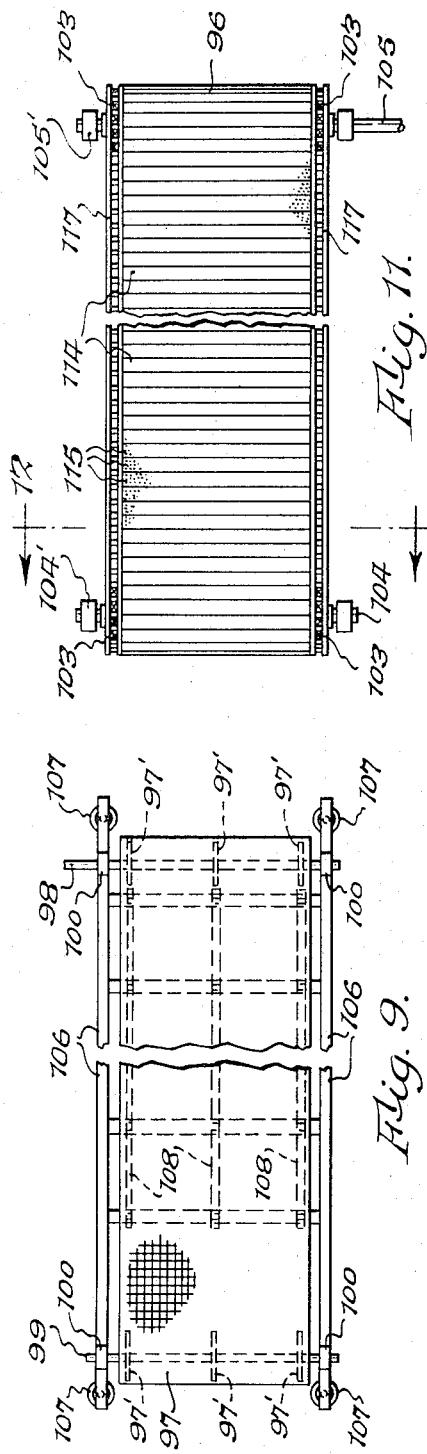

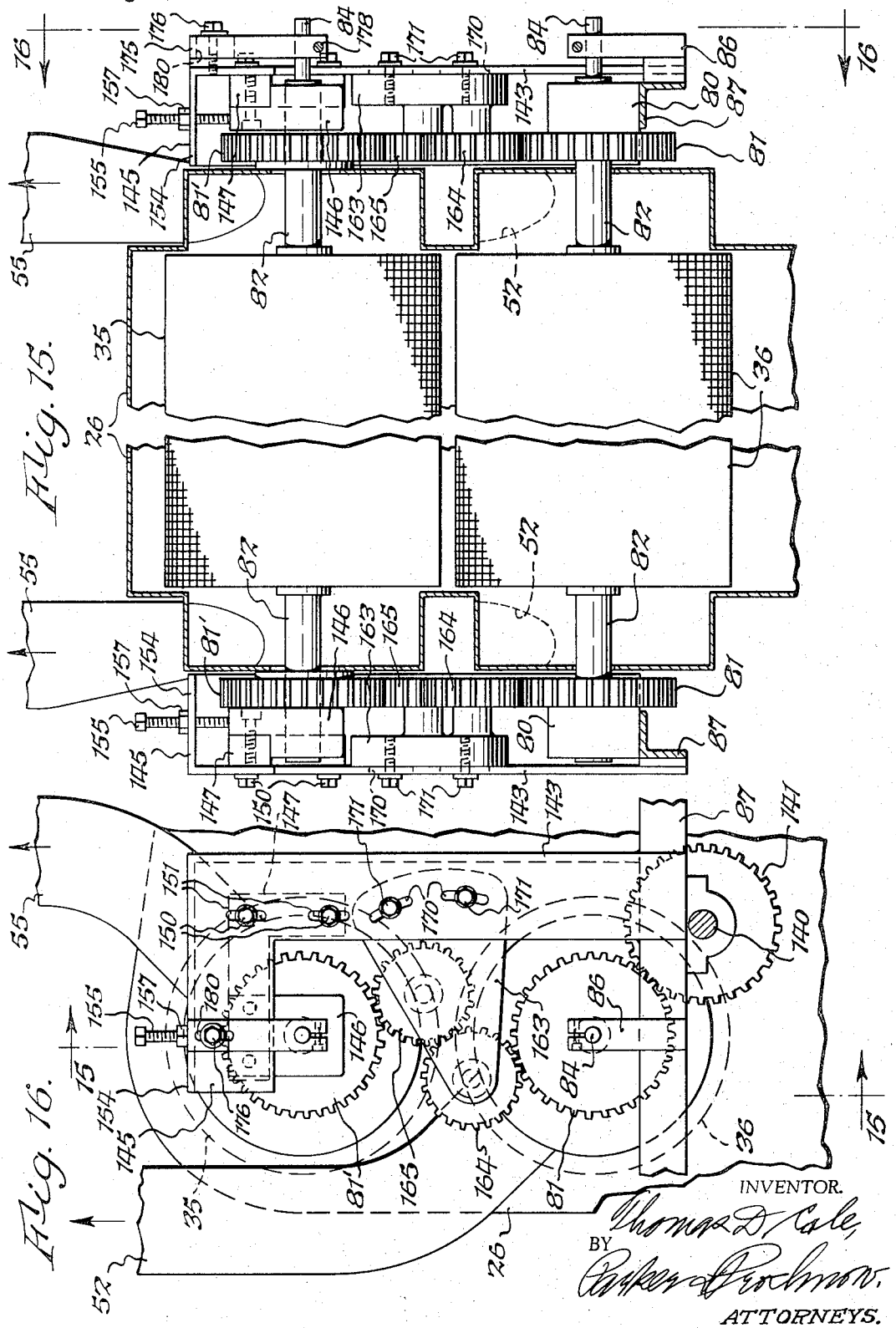

INVENTOR.
THOMAS D. COLE
ATTORNEYS

United States Patent Office 3,356,780
Patented Dec. 5, 1967

3,356,780
FABRIC MAKING METHOD AND APPARATUS
Thomas D. Cole, Lockport, N.Y., assignor, by mesne assignments, of fifty percent to Thomson and Schovee, Rochester, N.Y., a partnership, and fifty percent to Thomas D. Cole, Lockport, N.Y.
Filed Aug. 7, 1964, Ser. No. 389,513
17 Claims. (Cl. 264—91)

This invention relates to method and apparatus for making webs or fabrics from fibers bonded by means of plastic compositions. This application is a continuation-in-part of my application Ser. No. 251,393 filed Jan. 14, 1963, now abandoned entitled, Fabric Making Method and Apparatus. Illustrative of the products which may be made by the method and apparatus of my invention are the products described and claimed in application Ser. No. 188,086, filed Apr. 17, 1962, entitled Under Rug Fabric; application Ser. No. 188,483, filed Apr. 18, 1962, and now Patent Number 3,307,207, entitled, Insulator for Mattresses or the Like; and application Ser. No. 250,127 filed Jan. 8, 1963, and now abandoned, entitled, Seat Pad Assembly.

One of the objects of this invention is to provide a method and apparatus for producing webs of this kind made of fibers of cotton or other fibrous material which are bonded together by means of a plastic material and which have a high resistance to tearing, stretching and to penetration by edges or surfaces of rigid materials.

Another object is to produce a method and apparatus of this type which is efficient in operation and capable of high speed production of webs of this type.

Another object of my invention is to provide a method and means of air-laying individual and separated predominantly short cotton or other fibers, intermingled with finely divided plastic materials, wherein the fibers and interspersed plastic materials are blown through the air and subjected to several forces adjacent the vortex between two screen drums rotating toward each other whereby as, and prior to the collection of the fibers on the screens, they are subjected to changes in direction of movement which tends to cause a turbulence of movement of the fibers which produces in the web of material a random laying of the fibers to the end that the fibers are projecting in all directions in the web including the direction perpendicular to the planes of the web.

A further object is to provide means of improved construction for regulating the thickness of the web; also to produce a web of uniform thickness throughout.

My invention further contemplates a method and apparatus for air-laying individual, separated, predominantly short fibers, intermingled with finely divided plastic materials, wherein the fibers are formed into a web having planar surfaces with the fibers extending at random, that is, with some of the fibers extending parallel to the planes of the web and others extending at angles to said planes including perpendicular thereto, and thereafter subjecting the web to heat and pressure, while maintaining the same relationship of the fibers to each other, which causes the plastic to flow and coat the individual fibers to the end the fibers are bound into a homogeneous sheet or web of material of a selected thickness and density, resistant to the torsional, tension and compressive forces and resilient to the end the fibers will spring back to substantially their original positions after being subjected to said forces repeatedly and over a long period of time.

Other objects and advantages of this invention will be particularly set forth in the claims and will be apparent from the following description, when taken in connection with the accompanying drawings, in which:

FIG. 1 is a diagrammatic, longitudinal elevation, partly in section, of a web-forming machine embodying this invention;

FIG. 2 is a partial top plan view thereof;

FIG. 3 is a transverse, sectional view thereof on line 3—3, FIG. 1;

Figure 17:
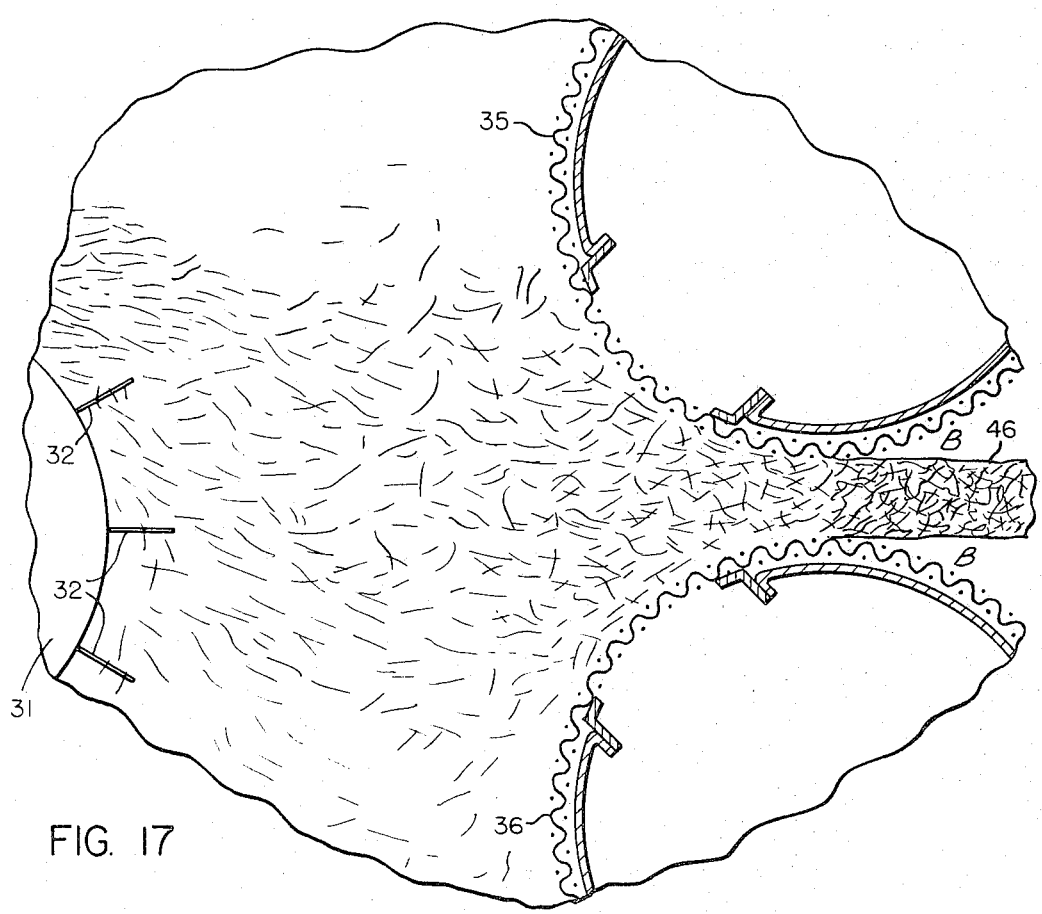
Figure 18:
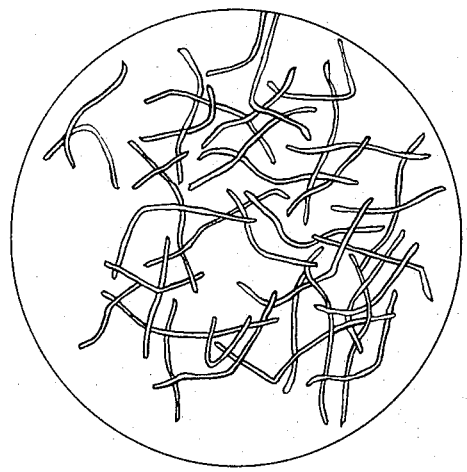

FIGS. 4 and 5 are sectional views taken on lines 4—4 and 5—5 of FIG. 3;

FIG. 6 is a fragmentary, longitudinal, sectional view on an enlarged scale showing the screen rolls between which the material is fed to form the web and illustrating the turbulent movement of the fibers adjacent the vortex between the screen rolls to accomplish the random laying of the fibers illustrated in FIGS. 8 and 17;

FIG. 7 is a fragmentary, transverse sectional elevation thereof on line 7—7 of FIG. 6;

FIG. 8 is a fragmentary, sectional view of a piece of the web formed by my improved apparatus and illustrating the random laying of the fibers;

FIG. 9 is a fragmentary section of the lower supporting belt which carries the material during its passage through the heating oven;

FIG. 10 is a fragmentary, enlarged view of the supporting structure of the lower belt;

FIG. 11 is a fragmentary view showing the upper belt which confines the material which is being formed into a web in the space above the lower belt and below the lower run of the upper belt;

FIG. 12 is a transverse, sectional elevation of a link or slat of the belt shown in FIG. 11 on line 12—12 of FIG. 11;

FIG. 13 is a face view of one of the slats or panels of the belt shown in FIG. 11;

FIG. 14 is a diagrammatic view showing the mechanism for maintaining the travel of the upper and lower belts at equal, lineal speeds;

FIG. 15 is a fragmentary, sectional elevation on an enlarged scale showing the screen cylinders and the drive for the same;

FIG. 16 is a side elevation thereof partly in section approximately on the line 16—16 of FIG. 15;

FIG. 17 is an enlargement of part of FIG. 6 illustrating what may be happening adjacent the vortex between the two screen rolls; and FIG. 18 is a microscopically enlarged photograph of a section of the web produced by the method and machine of my invention and illustrating the random laying of the fibers.

In FIG. 1, 20 represents a floor or supporting surface on which the apparatus embodying this invention may be mounted; 21 represents generally the part of the apparatus in which the loose fibers are distributed to position them in relation to each other to form layers of substantially uniform thickness and mixed with bonding material; and 22 represents generally the heating apparatus in which the fibers, assembled in the part 21, are subjected to currents of hot gases to melt the bonding material to bond the fibers to each other to form the desired web.

Any desired fibrous material may be employed for forming my improved webs, cotton being preferably employed because of its low cost, but other fibers may be equally well used for forming my improved webs, or they may be mixed with the cotton fibers. While any type of fibers may be employed, for reasons of cost the method and apparatus has been particularly designed for use in forming webs or pads of cheap fibers such as waste in the cotton fabricating industry, as for example, cotton floor sweepings, second cut and mill run linters, first cut linters, fly, clearer, napper and other cotton mill by-products and shredded clippings and defabricated fibers.

24 represents a mass or pile of fibrous material which is to be operated on and which may be supported on a platform 25 forming an extension of a housing or chamber 26. The platform 25 terminates in an inlet opening in the machine frame or housing 26, and a pair of feed rollers 27 are provided between which the fibers are passed by means of a roll 28 which is preferably fluted.

According to my method and apparatus, I bond the fibers together by means of a suitable resin or similar bonding material which is mixed with the fibers so that the fibers in all parts of the web will be bonded together by heating of the bonding material. This bonding material may be any suitable resin which when heated is converted into either a thermosetting or a thermoplastic material and is preferably in dry powdered or finely divided form. The bonding material is placed or fed into a hopper 29 having a discharge opening in the bottom thereof with which a fluted distributing or feed roller 30 cooperates and which distributes the resin uniformly on the mass or pile 24 of fibrous material. A freely rotatable brush 30' in contact with feed roll 30 maintains the feed roll clean. Consequently when the fibrous material is fed from the mass 24 and passed between the rollers 27, the resin becomes thoroughly distributed throughout the fibrous material particularly by the action of distributing cylinder 31. The quantity of resin fed to the fibers may be varied by varying the speed of rotation of the fluted roller 30. Consequently the quantity of resin, with relation to the quantity of fibers, may be varied according to the desired thickness of the fabric or pad or according to the stiffness of the padding desired. While the relationship of the quantity of resin to fibers may be varied widely, ordinarily the finished product will carry 17% to 26% of resin, by weight.

The fibers passing between the feed rollers 27 are conducted to a distributing cylinder 31 which may be of any usual or suitable construction having a number of outwardly projecting teeth or prongs 32 which pick the fibers from the mass entering the housing. Except for necessary inlets and outlets the housing is substantially air tight. This distributing cylinder is located in close proximity to the discharge rollers 27 and operates at a high speed, driven by any suitable means (not shown) so that it picks up the fibrous material and breaks it up into individual fibers separated from each other or small groups of fibers which are distributed in the air in the inner part of the housing 26. I have found that best results are obtained if this cylinder operates at a speed of at least 2,000 r.p.m. This cylinder also further mixes the dry powdered resin thoroughly throughout the fibers so that an even consistency of the combined resin and fibers is achieved. The high speed of rotation of the cylinder 31 impels the fibers and resin into the air stream, as will presently appear and greatly increases the production of the machine and speed of the fibers flying through the housing 26.

The fibers in the housing 26 are collected by means of a pair of revolving screen cylinders 35 and 36 arranged in immediate vicinity to an outlet opening 38 at the discharge end of the housing 26. The air is withdrawn from the interior of the cylinders. For this purpose the interior of the screen cylinders are preferably maintained at a sub-atmospheric pressure. This, combined with a positive pressure in the housing 26 causes the fibers to be deposited on the screens of the two cylinders. The screen cylinders each comprises two annular supports or wheels 39 and 40 (FIG. 7) to the peripheries of which the screens 41 are secured in any suitable manner. The screens may, if desired, be in the form of perforated sheet metal. A mass of fibers 44 and 45 (FIG. 6) intimately intermixed with finely divided resin, is separated from the air passing through the screens and is collected on the screens. As the peripheries of the two screen cylinders approach each other, as clearly shown in FIGS. 2 and 6, the fibrous material deposited on these two revolving screens is pressed together to form a single layer or web 46 which passes through the outlet opening of the housing 26.

As previously mentioned, the housing 26 is sealed and made as air tight as possible, except for necessary inlets and outlets, so that a positive pressure may be maintained in the housing. Part of the sealing of the housing 26 is shown at 26' in FIG. 6. The housing 26 is formed so that portions thereof at 33' (FIG. 7) extend into close proximity to the screening cylinders, thus dividing the housing 26 into an air and fiber-receiving compartment 33 and a compartment 34 into which air enters from the interior of the cylinders after passing through the screens.

It is necessary, of course, to distribute the fibers in the housing 26 in such a manner as to produce a deposit of fibers on the screen cylinders substantially uniform in volume throughout the length of the cylinders. This may be accomplished in various ways. The regulating of the air flow which enters the housing 26 through discharge tube or duct 50 (FIG. 1), its pressure and its distribution across the machine constitutes an important feature of the invention. The duct 50 receives the air which is withdrawn from the interiors of both of the screen cylinders 35 and 36.

In order to assist in producing substantially uniform suction lengthwise of the screen cylinders 35 and 36, I provide a pair of ducts 52 and 53, one connected to each side of the compartment 34 of the housing 26 adjacent to the lower screen cylinder 36 and another pair of ducts 55 and 56 connected to the housing 26 to receive air from the opposite ends of the upper screen cylinder 35. The intake ducts 52 and 53 are connected to the intake sides of a blower or fan 58 while the ducts 55 and 56 are connected to the intake sides of a blower or fan 59. The fans 58 and 59 may be driven by variable speed motors so that the vacuum on each screen may be varied independently of the other.

The fans 58 and 59 are connected to two discharge ducts 54 which are merged into a single passage or duct 50. The duct 54, as clearly seen in FIG. 2, flares outwardly at its lower end, as shown at 60, to a width somewhat less than the width of the housing 26. The flaring lower end has been found important in order to produce uniform distribution of fibers over the distributing cylinder and, with other factors, over the screens on the screen cylinders. The air, carrying fibers which have passed through the screen cylinders 35 and 36 together with any powdered resin which is not retained by the fibers in the housing 26, is discharged into the upper wall of the housing 26 adjacent to the distributing cylinder 31. Means are also provided to blow the air, fibers and resin discharged from the flared end 60 of the conduit 50 in such a manner as to distribute the same throughout the width of the housing 26 to form the layers of fibers 44 and 45 of substantially uniform thickness.

It has been found very important to have the air withdrawn from both ends of both screen cylinders pass into the common duct 50, since this arrangement eliminates turbulence and imbalance of the air streams which would result if these air currents from the separate ducts from the two blowers were discharged separately into the housing 26. The use of a common duct 50 also stops the fibers from wandering or going to the wrong places when passing through the flared opening 60.

The blowers 58 and 59 may be driven in any suitable manner. For example, as shown in FIG. 2, these blowers have shafts 61 extending to opposite sides of the apparatus where they are provided with pulleys driven by belts from any source of power. These blowers are driven by motors which develop a high degree of suction on the rotary screens and a strong blast of air through the nozzle or flared opening 60, so that the fibers blown at high velocity through the housing 26 results in high production as compared with machines heretofore available. Preferably, as previously mentioned, the blowers 58 and 59 which produce the suction pressure on the screens 35 and 36 are driven by variable speed motors. The vacuum on both screens should be the same as the fibers and, particularly the lighter resin, will tend to fly to the screen on which a greater subatmospheric pressure is being imposed. The adjustment of the blower speeds compensates for any differences in friction that may exist in the piping and any difference in static pressure on the screens. By adjustment of the motor speeds, the vacuum on each screen may be made the same. Suitable vacuum gauges may be used to indicate to the operator when the sub-atmospheric pressures are equalized.

The blowers 58 and 59 using open wheel type or bladed impellers discharge the circulated air at a positive pressure so that the air issuing from the nozzle or flared opening 60 is under a positive pressure. This positive pressure need not be great as we are dealing with light materials. An important aspect of my invention is the control of this pressure and volume of the air so that it is equalized transversely of the air space. I have found that, contrary to what normally may be expected, a smooth and symmetrical contour of the passage 50 and at the flared end 60 thereof does not necessarily produce an equal volume and velocity of the air stream transversely of the housing 26. Perhaps eddys or turbulences are created in 50 and at 60 which causes unequal velocities and volumes of air to issue at different points transversely of the flared end 60. In order to control the distribution of air, impelling the fibers and resin through the housing 26, it is important to provide suitable controls at the flaring discharge end 60 of the duct 50. Any suitable means may be employed for this purpose to regulate the flow of the air as it issues from the open end of the downflow duct. In the particular construction shown (see FIGS. 2–5), I have provided at the mouth of the flared passage 60 a plurality of dampers 63 (FIG. 3) extending across the opening of the flared part 60 of the duct 50 and movable crosswise of the discharge part 60. These dampers are adjustable independently of each other. The operator can determine by the thickness of the material at different portions of the width of the web as it issues at the outlet 38 from the screens as to how the in-flow of air into the housing must be controlled. These dampers 63 should be preferably of lesser area than the cross sectional area of the duct 50.

As previously mentioned, the blowers discharge the air into the duct 50 at relatively high velocity and preferably a slight pressure. This pressure and velocity, as the air issues at the flared end, may be controlled by permitting more or less air to pass through the spaces between the dampers. It is not essential that the air in the duct 50 be discharged by the blowers at a positive pressure, as the vacuum in the screens will draw the air, carrying the fibers and finely divided resin, across the air space. It is important, however, that the dampers be capable of restricting the discharge at 60 to create a back pressure so that the air will issue at 60 under a positive pressure. More important is the fact that the dampers transversely of the flared end 60 may be opened different amounts so that the operator by adjusting the dampers, may obtain equal volumetric and velocity of flow across the air space. Proper setting of the dampers can be determined visually as the web issues from the chamber 26 at the discharge outlet 38.

The difference in area of the duct 50 and the spaces between the dampers need only be about 5 to 10 percent. The dampers are slidable crosswise of the part 60 and are connected to rods 64 extending through guide openings formed in plates 65 at the discharge end of the flaring part 60 of the discharge duct. Set screws 66 in the plates 65 may be used to fix the plates in position. Consequently it will be obvious that any of the rods 64 may be moved inwardly and outwardly to position the dampers independently of each other to the extent desired to produce the desired distribution of air and material carried thereby as well as the fibers and resin discharged into the housing 26 by the distributing cylinder 31, lengthwise of the screen cylinders in the housing. When these dampers are correctly adjusted, the web 46 discharged from the housing 26 at 38 should be of approximately uniform thickness throughout its width.

Further regulation of the thickness of the layers of material discharged from the housing can be accomplished by controlling the extent to which air can enter the cylindrical screens 35 and 36. This may be accomplished by means of an imperforate, partly cylindrical shield or drum 73 (FIG. 6) arranged within each of the cylindrical screens. In the construction shown for this purpose, each shielding drum comprises a pair of spoked wheels 70 and 71 having parts of their peripheries covered by any imperforate material such as, for example, sheet metal 72. The shielding material in the drum of the upper screen cylinder terminates at 74 and 75 thus leaving an opening between these two ends of the shielding material. In the lower screen cylinder the impervious shielding material terminates between the ends 76 and 77. The openings in the shielding material of the two drums may be made equal but if desired they may be made unequal. The openings of the two control drums may be positioned in any desired relation to the screening cylinders and may be adjusted to regulate the amount of material deposited on each of the screen cylinders as will presently appear.

In the construction illustrated, both screen cylinders are driven in a similar manner. The drive for the lower screen cylinder is shown in the drawings and comprises wheels or driven members 39 and 40 mounted on and fixed to hollow shafts 82 (FIG. 7) journalled on bearing brackets 80 arranged at opposite ends of the cylinder. Gears 81 are mounted on and fixed to the hollow shafts 82. The gears are driven in any suitable manner and at any desired speed by usual means, not shown, to provide the desired rotation of the screen cylinders.

Through the hollow shafts 82 extends an adjusting shaft 84 suitably keyed to the wheels 70 and 71 forming the end walls of the air shielding or regulating cylinders, and extending out of one side of the housing 26. Each of these shielding cylinders is adjustable manually in a rotational direction. The adjusting shaft of the lower cylinder may be secured in adjusted position by means of a fixed arm 86 having its upper end clamped to the adjusting shaft 84 and mounted on fixed supports secured to an extension 87 of the bearing support 80. The upper shielding cylinder may be similarly adjustably clamped as will later appear. Thus two shielding or air-flow controlling cylinders may be adjusted about the axis of the adjusting shafts 84 independently of each other.

In the construction shown in FIG. 6, the ends 75 and 76 of the control cylinders are located adjacent to each other. The ends 76 and 77 of the lower screen cylinder are located preferably approximately the same distance apart although as previously stated, the amount of opening in each screen allowed may be different. Moreover, as described, the location of the points 75 and 76 may be varied but in general the shielding cylinders 73 should be arranged so that the suction within the screen cylinders is not effective directly at the point where the two webs are combined and leave the machine as a single web as shown in the drawings. This means that the points 75 and 76 should be forward of the points defining the minimum distance between the drums so that the webs will leave the cylindrical screens approximately at the points of tangency of the screen cylinders. Thus the two webs are combined into a single web beyond the point where the vacuum in the screen cylinders is effective. The points 75 and 76 as described may be adjusted by rotating the shielding cylinders, but once located so that the combined web comes off the screen cylinder smoothly and without fibers unduly adhering to the screens there is little need for adjusting the position of the shielding drums.

The thickness of the web deposited on the screens is a function of the amount of material fed to the chamber or housing 26 and the speed of rotation of the screens. The former may be readily varied by varying the volume of fibers fed from the mass 24 and the amount of bonding material fed from the hopper 29. The latter may be varied by varying the speed of rotation of the screen cylinders. Any suitable variable speed drive may be provided for rotating the screen cylinders. The screen cylinders, as will presently appear, may be positioned at different distances from each other to accommodate webs of different thicknesses. In general, if the volume of fibers and bonding material fed to the chamber 26 is increased or the rate of rotation of the screen cylinders is decreased, the thickness of the webs will be increased so that it may be necessary to increase the distance between the screens. Moreover, the distances between the screens may require variation in order to apply a slight pressure on the combined web as the two webs come together and leave the chamber. This pressure should preferably only be sufficient to intermingle the fibers of the two webs and give the combined web a slight compaction to hold the fibers of the web together as the web is transported to the heating chamber.

From the foregoing, it will be apparent that adjustments of the machine provide a number of variable factors and that these factors introduce variables in the method of my invention. The control of these factors determines the character and fitness of the product for the purpose for which it is desired by the user thereof. The variables may be summarized as follows:

(1) The type of fibers used. Waste cotton fibers are preferred as they are relatively inexpensive but other stronger fibers may be desired for some special purpose.

(2) The length of the fibers. In general short fibers are preferred because they appear to lend themselves more readily to "random" laying as random laying is defined above.

(3) The type of bonding material which should be a thermosetting or thermoplastic material in preferably powdered or finely divided form, fusible at a temperature compatible with cotton fibers so that the cotton fibers will not scorch at the fusion temperature if exposed thereto for a reasonable length of time.

(4) The ratio of bonding material to fibers. This ratio controls in general the hardness of the product; the resiliency of the product; the ability of the product to absorb sound and vibrations; the porosity of the product and its ability to "breath"; and other physical factors.

(5) The interaction of the forces urging the fibers and finely divided resin across the air space to the screens to produce turbulence in the flow of fibers and resin and what may be termed a "vortex" adjacent the screens. The interaction of these forces produces the random laying of the fibers and the thorough mixing of the resin and fibers and include the pressure and velocity of the air stream across the air space; the distribution of the air across the air space; the velocity of rotation of the distribution drum and its ability to break up clumps of fibers and discharge them at high velocity into the air stream; the arrangement of the rotating screens with respect to each other; and the sub-atmospheric pressure produced therein the latter two of which assist in producing a change in direction of flow of the fibers and a turbulence of flow which is important in producing random laying of the fibers.

(6) The spacing of the screens from each other and the pressure exerted by them.

The loosely formed web then passes to the heating apparatus which further influences the final product. The web of fibers 46 when discharged from the housing 26 is conducted to the heating apparatus 22 which plasticizes the resin which is intermingled with the fibers and bonds the fibers together. This heating apparatus is arranged within another housing 90 provided with an inlet 91 into which the web 46 is conducted in any suitable manner, for example, by means of a belt 92 which runs over supporting rollers 93 from the discharge of the housing 26 to the inlet 91 of the housing 90. In the space between the discharge opening of the housing 26 and the receiving end of the belt 92, a supporting roller 94 may be provided to ensure that the web 46 will pass from the discharge end of the housing 26 onto the upper run of the belt 92 which travels in a direction toward the housing 90 of the heating apparatus.

This heating apparatus may be of any suitable or desired construction and includes upper and lower conveyor chains or belt 96 and 97 which are at least as wide as the web 46 and which have ample openings or passages through which hot gases may pass for curing the resin mixed with the fibers. The lower conveyor belt at the receiving inlet of the housing 90 is provided with an upwardly inclined portion which forms with the lower run of the upper conveyor 96 a converging mouth to guide the web 46 into the space between the two conveyors at which the conveyors are close together. The space between these two conveyors is adjustable, as will presently appear, to vary the thickness, compression and density of the web which is compressed between these two conveyors while being heated.

The lower conveyor belt 97 meshes with toothed or sprocket wheels 97' mounted on shafts 98 and 99 suitably journalled in bearings 100 (FIG. 9). The bearings 100 are carried by a platform 106 which is adjustable vertically to vary the distance between the conveyors and hence the thickness of the web which is being operated on. This distance or web thickness adjustment may be effected in any desired manner. In the construction shown, elevating means, such as jacks 107 (FIG. 1) are provided by means of which the supporting frame 106, together with the lower conveyor belt, may be moved up and down relative to the upper conveyor belt to adjust the space between the belts according to the desired thickness, density and compression of the web. The upper run of the lower conveyor belt operates on tracks or other supports 108 which are mounted on the platform 106 (FIG. 1) to support this run of the lower conveyor belt in a desired location with reference to the lower run of the upper conveyor belt. The support 108 is an open framework and is such as to permit hot air or gases to pass freely through the same and through the openings in the belts. The shaft 98 is driven and the shaft 99 is an idler. Any number of sprocket wheels 97' may be provided, three being shown in FIG. 9 at each end of the conveyor.

The upper conveyor belt 96 operates over toothed or sprocket wheels 103 secured on shafts 104 and 105 (FIG. 11) suitably journalled to the upper part of the frame of the heating apparatus in bearings 104' and 105'. The lower run of this upper conveyor belt 96 is supported by several support rails 96' (FIG. 1) against upward pressure of the web 46 while the upper run is supported on the rails 96".

The belts may be of any suitable perforate construction and as illustrated, the lower belt 97, as shown in FIGS. 9 and 10, may be formed of a series of metal strips or interconnected links 110 bent alternately back and forth, each strip being connected to adjacent strips by pivot pins 111. There is thus formed an endless belt on which the web 46 may rest and against which the web is compressed. The links 110 provide an open lattice with ample air spaces through which the hot air may pass to the web 46 for passage therethrough.

As shown in FIG. 8 and more clearly in FIG. 17, the lattice of links, when the web is subjected to pressure applied between the conveyors, forms indentations or grooves 112 (FIG. 8) on the lower side of the web. These grooves 112 extend from one side of the web to the other and of course longitudinally of the web. The grooves provide an interconnected continuous lattice in the web which I have found to be important in producing a number of commercial articles. It appears that the hot gases passing over the metal lattice, heats the metal to an extent such that the resin melts more readily adjacent the metal and tends to flow toward the grooves to provide what appears to be a concentration of resin at and adjacent the grooves. When this resin cures and hardens, as it dries and solidifies, it produces a strengthening interconnected lattice which can be identified in the product as a brownish interlacing network in intaglio.

The importance of the intaglio lattice is that it provides a strengthening network particularly when the finished product or fabric is placed in tension. For example, if the fabric of FIG. 17 is split in a plane parallel to its surfaces, the half with the lattice may be as much as fifty percent stronger in tension than the other split half. In a product such as a seat cushion, as shown in my application Ser. No. 250,127, when the lattice side is placed adjacent the springs and the weight of a person is applied on the seat, the springs are compressed and the lower side of the pad or fabric is placed in tension. Not only is the pad materially stronger in tension but also the strengthening lattice resists the penetration of the springs into the fabric. These same pad qualities are equally important in a mattress pad as shown in my application Ser. No. 188,483. In a pad for use under rugs, strength in tension is important because the pad is pulled, stretched and otherwise handled to get it into the desired position. More important in an under rug pad is the fact that the lattice engages the floor and lends to the pad anti-slip qualities. Such a pad is shown in my application Ser. No. 188,086. The pad with the lattice also appears to be materially more resilient when in use.

The upper belt 96 is formed of slats or plates 114 extending crosswise of the belt. These slats are preferably of metal, have perforations 115 extending therethrough which the hot gases pass through after their passage through the web 46. The slats are positioned with their lateral edges in close proximity to each other, actually substantially touching to present a smooth surface. The slats are very apt to warp and change their shapes due to the temperature of the hot gases flowing between them and the resultant expansion and contraction forces exerted upon them. This warpage might form spaces between adjacent slats through which the web 46 might be pressed thus forming projecting parts or ridges in the finished fabric and an inferior product. To prevent or minimize warping of the slats I have provided a pair of reinforcing strips or plates 215, FIGS. 12 and 13, which are welded or otherwise secured to each of the slats in a manner which avoids the effects of unequal expansion and contraction of the parts. One end of each of the slats is secured as by welding to an angle-shaped piece 116 which is rigidly secured to chain links 117 which support and advance the slats as driven by sprockets 103.

The pair of reinforcing strips are in edge contact with the flat lower surfaces of the slats. Intermediate their ends the strips 215 bend slightly so as to converge toward each other and are approximately in contact with each other at the middle portion. The reinforcing strips 215 have longitudinal slots through which pins 118 pass. The ends of these pins are secured to supports or posts 119 secured to the slats 114. Along the reinforcing strips other pins 120 are provided which also pass through longitudinal slots in the reinforcing strips and which are rigidly secured to the supports or posts 121 secured to the slats. The other ends of the reinforcing strips 215 are not welded to the slats so that they are free to shift longitudinally of the slats. These ends of the reinforcing strips are also welded to angle pieces 116 which carry chain links 117. The construction described has been found to hold the slats in substantially straight positions with respect to each other and avoid any substantial warping or deformation of the slats due to pressure applied by the belt 97 against the web 46. The reinforcing strips hold the slats rigid against the upward pressure exerted by the web. Thus the surface of the slats presented to the web is smooth and uninterrupted and due to the fact that the strips are welded only at one end to the slats the slats and reinforcing strips are free to shift with respect to each other as dictated by unequal expansion and contraction of the parts under the temperatures involved.

The heat may be conducted to the web in the heating apparatus in any suitable or desired manner. For example, in FIG. 2 I have shown a blower 125 which receives air from a part of the heating apparatus, such as a part between two end walls of two channels 126 which constitute air deflectors or guides. The heated air passes from the blower through tubes or conduits 127 to the channel-shaped ducts 126 which are open at their lower sides. These open sides face the lower run of the upper conveyor belt 96 so that the fan forces air downwardly through the web, as shown by the arrows in FIG. 1. A channel or guide 126' is connected to the suction sides of the blower as shown in FIG. 2. The flow of hot air is then reversed in the heating apparatus so that it passes upwardly through the supports 108; the lower and the upper run of the lower conveyor belt; then through the web 46; then through the lower run of the upper belt; and then into the space between the channel-shaped deflectors 126 through the guide 126' back to the blower 125.

There is also provided an inlet 128 such as oil burner nozzle (FIG. 2), leading into the conduit 127 from a burner or other heating device (not shown) which discharges its gases of combustion into the conduit 127. Products of combustion are preferred as a heating medium since they will not support combustion of a fibrous material which is being treated, thus minimizing a fire hazard. Any other means for passing a gaseous heating medium through the web alternately in opposite directions may be provided. The temperature of the products of combustion from the burner is, of course, thermostatically controlled so as to convert the resins mixed with the fibers into plastic compositions which bind together the fibers throughout the web without damage or charring of the fibers. A vent connection to a stack (not shown) would also be provided as is usual in such heating apparatus. The system may be essentially that described and claimed in my copending application Ser. No. 75,223 filed Dec. 12, 1960.

In that application I have described the problem of removing heavy oil from scrap cotton in the form of floor sweepings. As previously mentioned, a major factor in the development of my process is to provide a process wherein padding having a number of commercial uses, may be made of by-product cotton of which there are at least six grades, including floor sweepings selling at various prices but at very substantial discounts from staple new cotton which sells normally at approximately thirty-five cents per pound. At this price for staple cotton, floor sweepings will sell at approximately six cents per pound. Floor sweepings are preferred in my process because in general they are longer fibers than most other forms of low priced by-product cotton. Floor sweepings are not always available on the market so that the process must be adaptable to the use of other low priced cotton such as linters or a mixture of floor sweepings and other by-product cotton. Floor sweepings present a distinct problem in their use because they usually contain a large percentage of heavy machinery oil used in the maintenance of textile machinery. However, oil is always present in by-product cotton as light oils are added to raw cotton to enable the cotton to be worked in textile machinery such as carding machines. Oil in the cotton increases the fire hazard in curing the resin.

To melt the resin and cause it to flow and coat the cotton fibers, and incidentally drive off the oil with the air stream, particularly heavy oil, requires a temperature of approximately not less than 325° F. In my process I prefer to use higher temperatures. At higher air temperatures the process is speeded up, but at any elevated temperature suitable for my use, there is a problem of charring the fibers and occasionally, in the use of my process, the fibers ignite, particularly when the cotton contains a large percentage of oil. The charring of the fibers and the fire hazard increases with the use of floor sweepings.

In the operation of my process, in this part of the apparatus the air and gas passing to the material on the conveyor may be elevated ordinarily to temperatures ranging between 325° F. to 475° F. although these temperatures may be varied considerably. For example, if the conveyors are operated at a sufficient speed, the temperature of the air and gases may be raised to as much as 550° F. this temperature being desirable if a vinyl resin is mixed with the fibers or if a very thin padding is being made or a fast conveyor speed is being used. If a phenolic resin is employed the apparatus may operate at a temperature of about 350° F. and at slower conveyor speeds. In either case the melting of the resin due to the latent heat of fusion absorbs much of the heat of the air, so that the fibers are protected against damage by overheating.

The speed of travel of the fibrous material through the apparatus may vary from 7 to 60 feet per minute. If, for example, the apparatus is thirty feet long, material may be passed through the apparatus in approximately from one to four minutes depending upon the temperature of the incoming air and gas and upon other conditions such as the density or thickness of the material. If a higher temperature is employed, the material, particularly a thin padding should be passed through the apparatus in about one minute or less to avoid damage to the material.

The web 46, after its passage between the belts may be discharged directly from the apparatus or may be passed over a series of belts 129 which pass over a plurality of rolls 130 above the heating apparatus, which permits the web to continue to be exposed to lost heat from the top of the heating chambers to further set the resin and fibers.

The heated products of combustion after passing through the web 46 may be conducted to the incoming fibers, passed to the pile of fibers 24 to remove moisture therefrom which the fibers may have absorbed from humid air, or if desired, the heated products of combustion, after exposure to the web 46 over the heating apparatus, still have sufficient heat so that they may be passed into contact with the incoming fibers by means of suitable ducts, not shown. The incoming fibers may of course be dried by other means. It has been found that dry fibers can be more readily fluffed out by the distributing cylinder 31 when they enter the machine in relatively dry and fluffed-out condition, and this in turn results in a better web 46. Consequently the fibers are first thoroughly opened or fluffed before they are deposited on the pile fibers 24 and are then further fluffed by the cylinder 31 so that any compacting resulting from the deposit of fibers on the pile 24 is counteracted by the cylinder 31. The fibers are carried to and in the machine by air and consequently the fibers must be dry and thoroughly fluffed out into individual fibers or small clumps of fibers to be effectively carried to and through the apparatus.

A difficulty encountered in a heating apparatus of this type is caused by the difference in thermal expansion of the two conveyor belts 96 and 97 as they pass through the heating zone. This causes unequal expansion of the conveyors as they progress through the heating apparatus, in effect accelerating one in lineal travel in relation to the slower expansion of the other.

It must be realized that when the belts first enter the heating apparatus they are relatively cool. As they progress through the apparatus they gradually pick up heat until they reach the temperature of the hot gases in the apparatus. Since the two belts 96, 97 are of different mechanical construction, since the product requires this, each has a different thermal expansion so that as they proceed through the apparatus and are heated, one elongates faster than the other, or in other words, has the effect of traveling at a slightly higher lineal speed. Of course after the apparatus has been in operation for some time this effect is minimized, but even after the system is up to temperature, there is a difference in the lineal speed of one conveyor with relation to that of the other.

It is, of course, necessary that the two conveyor belts 96, 97 run at the same speed since if one of the belts ran at a higher speed than the other, there would be a tearing action in the web which would decrease its strength and other properties, and would prevent proper bonding together of the fibers. For this reason, I provide each of the two drive shafts of the belts, namely the drive shaft 98 of the lower belt and the drive shaft 105 of the upper belt, with two motors 133 and 134 respectively. The speeds of these two motors are controlled by means of a speed control device 135. Speed control devices of this kind in which one is called a master and the other a slave are well known and may be purchased in the open market and consequently further description of the same herein is not deemed necessary.

I have shown in FIG. 8 an enlarged view of a small portion of the fabric 46 which illustrates the random lay of the fibers with some of the short fibers 140 lying substantially perpendicular to the web and other fibers lying in a general direction lengthwise of the same. The short vertical fibers 140, whether extending out beyond the upper surface of the web or arranged within the web serve the purpose of providing an improved cushioning effect because of their property of readily flexing when weight is placed on the web, and then returning to their original positions when the weight is removed. Many of the longer fibers are arranged approximately parallel to the web, extending both lengthwise and crosswise thereof, and these fibers add greatly to the tensile strength or toughness of the web so that blunt points, if forced against the web, will not puncture the web and result in very little change in the web. Most felts or other unwoven webs are readily punctured or torn by even blunt objects. Tearing is resisted to a much greater extent by means of the web formed as herein described, both because of the lay of the longer fibers substantially parallel to the web and because they are bonded by the plastic material. For example, when a pad with a substantial percentage of resin is employed, and the pad is directly in contact with the springs of a mattress, as shown in my copending application Ser. No. 188,483, it will resist puncture and deformation.

FIG. 8 also shows a number of indentures 112 in the lower surface of the web. These indentures are produced by the open metal links of the lower belt (FIG. 9). They result in a lattice construction on one side of the finished fabric as illustrated in my application Ser. No. 188,086. This lattice is continuous and extends from one edge of the fabric to the other and has been found greatly to increase the strength of the fabric in tension. They appear as dark indented intaglio lines in the fabric. In examining the fabric there appears to be a concentration of plastic at and adjacent the indenture lines perhaps caused by a tendency of the plastic to flow toward the metal of the links when the plastic is in a molten condition. The lattice in the fabric is more pronounced if the ratio of plastic is increased or the pressure between the belts is increased.

The apparatus herein described is very versatile and can produce webs differing greatly not only in thickness, but also in their flexibility or rigidity. The flexibility and rigidity of the web is controlled by the amount of resin fed to the fibrous material from the hopper 29 in proportion to the amount of fibrous material. Furthermore, the firmness or flexibility of the web can also be controlled by the pressure applied to the web when passing between the conveyor belts in the heating apparatus. If a very soft and readily flexible web is desired, a relatively small amount of resin is fed to the fibrous material. This is the normal way of producing a soft and flexible web but if desired the two conveyor belts 96 and 97 may be spaced apart to a greater degree to produce a lesser pressure on the web resulting in a lesser compaction of the web. In general, a greater amount of resin and/or increased pressure on the web during the heating of the same results in a firmer, stronger and less flexible web and one of a greater density.

The two screen cylinders may be adjusted toward and from each other in any suitable manner to enable the apparatus to produce webs of different thicknesses. This is done by increasing the number of pounds of material (fibers and plastic) fed to the machine so as to produce a web having more material per lineal foot, or by maintaining the amount of material constant and slowing down the screen cylinders. In the construction shown for varying the spacing between screens (see particularly FIGS. 15 and 16), the lower screen cylinder 36 rotates about a fixed axis and the upper screen cylinder 35 is adjustable vertically to vary the space between the two cylinders. The lower screen cylinder has its hollow shafts 82 extending into bearings 80 (FIG. 7) supported on the frame member 87, and the power for rotating the screen cylinders is delivered to the machine through a shaft 140, FIG. 16, mounted in bearings secured to the lower face of the frame member 87. The shaft 140 has gears 141 mounted thereon to mesh with the gears 81 at opposite sides of the apparatus and at opposite ends of the lower screen cylinder. The separate driven gears 81 on opposite sides impart rotation to the two discs or wheels 39 and 40 of the lower cylinder without necessitating the transmission of torque through the cylindrical screen itself.

There is also provided on each side of the apparatus an upwardly extending frame member 143 of angle-shaped cross section which may be secured to the lower frame member 87. These frame members are arranged at opposite sides of the apparatus and spaced from the shafts of the two screen cylinders and the gears connecting the same, and each of these frame members has a horizontally extending arm 145 which extends directly over the bearings of the upper screening cylinder. These bearings are supported on blocks 146 which in turn are supported on brackets 147 adjustably mounted on the upright frame members 143 and the horizontally extending arm 145. These brackets 147 and the frame members 143 may be adjustably connected in any suitable manner, for example, by means of bolts 150 extending through upright slots 151 formed in the brackets 147.

The adjusting of the upper screening cylinder may be effected in any desired manner. For example, the horizontal arm 145 of each frame member 143 has a horizontally extending flange 154 through which an adjusting screw 155 extends. This screw may have its lower ends swivelled in the block 146 and has a threaded engagement with a nut boss 157 secured to the flange 154 so that by turning the two screws 155, the blocks 146 may be raised and lowered as desired. When the upper screen cylinder has been located in the desired position, the clamping bolts 150 may be tightened to lock the brackets 147 in adjusted position.

Both of the screening cylinders are positively driven at the same speeds and in the construction shown the upper cylinder 35 is driven from the gears 81 secured to the hollow shafts 82 of the lower cylinder. In the construction shown for this purpose, adjustable brackets 163 are provided on each side of the apparatus and adjustably mounted on the frame members 143. Each of the brackets 163 has a gear 164 mounted thereon which meshes with a gear 81, and another gear 165 is also journalled on the bracket 163 and positioned to mesh with the gear 164 and with a gear 81' secured to one of the hollow shafts of the upper screen cylinder. The brackets 163 are provided with arcuate slots 170 through which clamping bolts 171 pass for securing the brackets 163 in position in which both of the gears 165 mesh with the gears 81' of the upper screening cylinder. Consequently, by menas of this construction the upper screen cylinder may be driven in any position in which it is set.

At one side of the machine the laterally extending arm 145 of the frame member 143 is provided with a clamping bar 175 suitably mounted thereon, for example, by means of a bolt 176. The lower end of this clamping bar has an aperture through which the adjusting shaft 84 of the upper cylinder extends and this end of the bar 175 is split below the opening in a similar manner as the clamping bar 86 for the lower screen cylinder, so that the adjusting shaft 84 may be clamped in set position by means of a clamping screw 178 extending across the split part of the clamping bar 175. Since the shaft 84 for the shielding cylinder moves upwardly with the upper screening cylinders 35, the clamping bar 175 is provided with a slot 180 through which the bolt 176 extends, thus permitting the clamping bar 175 to move vertically with the upper screening cylinder when the bolt 176 is released.

It will of course, be obvious that when the screen cylinders are spaced farther from each other, a corresponding reduction of speed of rotation of the cylinders may be made, to permit a larger amount of fibers to be deposited on the cylinder to form a web of greater thickness. However, the speed of rotation of the screen cylinders may be maintained and the amount of material fed may be increased. In addition, it may be desirable to increase the rotational speed of the distributing drum.

The two parts of the apparatus are preferably driven independently of each other and the speed of operation of either part may be regulated so that the heating apparatus 22 takes up the web at about the rate at which it is discharged from the web-forming apparatus 21. Preferably the rate of speed of the part 21 of the apparatus is first regulated to form a web of the desired thickness and the rate of speed of the heating apparatus 22 is then manually regulated accordingly.

The apparatus described is capable of operating with high efficiency and producing webs at a much more rapid rate than was heretofore possible. This is due partly to the high rate of rotation of the fiber distributing cylinder 31 and to a rapid rate of circulating air from the interiors of the screening cylinders to the housing 61, with the result of a rapid deposit of fibers on the exposed surfaces of the screen cylinders.

In FIGS. 17 and 18, I have endeavored to illustrate one of the more important aspects of my invention and what may be happening during passage of the fibers and finely divided resin through the chamber 26 until it emerges as a loose web prior to passage to the pressure-heating unit. As previously mentioned in the method of my invention, a random laying of the fibers is accomplished, as illustrated in FIG. 8, and more clearly in FIG. 18, which is a microscopic photographic enlargement of a section of the padding actually produced by the method and apparatus of my invention.

From an examination of FIG. 18, it will be apparent that the fibers extend in all directions or at random. Some of the fibers lie parallel to the surface 46' of the padding 46 (FIG. 8); some of them at an acute angle to said surfaces 46' and at various angles to each other; while still others extend at angles substantially normal to the planes of the surfaces 46'. This is what I term a "random" laying of the fibers and is what I believe accounts for the unusual springiness and resiliency of the padding produced. It may also at least partly account for the unusual strength and wearing qualities of the padding. The fibers are flying through the air toward the screens and the particles of resin are doing likewise which results in a thorough intermingling of the resin particles with the fibers so that when the resin is later melted a large proportion of the individual fibers are coated with resin and the fibers are individually bonded together when pressure is applied. Such coating and consequently bonding of the individual fibers is illustrated in the above mentioned applications.

The "random" laying of the fibers, I am not fully able to account for. However, I think I may be causing a random movement of the fibers adjacent the portion of the air space marked V in FIG. 17 which for convenience of designation I call a vortex. That is, the fibers and resin are acted upon adjacent the vortex by a multiplicity of forces: the velocity and pressure of air issuing from substantially tangentially with respect to the rapidly rotating drum 31; the impetus or kinetic energy imparted to the fibers and resin by the drum 31 as it rotates at high speed; and the vacuum present in each of the rotating screens. While the effort is made to maintain the vacuums on the two screens substantially equal, this can seldom if ever be the case. Moreover, the effectiveness of the vacuum in each revolving screen may be different because of unequal shrouding of the screens by the already deposited fibers. In any event, I believe there is a whirling action of fibers adjacent the letter V which causes a deposit of the fibers on the web as it is formed not in layers of parallel fibers but at "random" as defined above.

While I have shown and described the preferred form of mechanism of my invention it will be apparent that various modifications and changes may be made therein particularly in the form and relation of parts, without departing from the spirit of my invention as set forth in the appended claims.

I claim:

1. A web forming apparatus including:
   (a) a housing;
   (b) means for admitting fibers mixed with a resin into said housing;
   (c) a distributing cylinder adjacent to the entrance of said housing to which said fibers are passed and which separates the fibers from each other and throws them at random through said housing;
   (d) a pair of cylindrical rotary screens in said housing against which fibers are directed by said distributing cylinder;
   (e) means for withdrawing air from each of said screens from opposite ends thereof;
   (f) a blower for each of said screens;
   (g) a conduit into which the air currents from both of said blowers are directed and which terminates in said housing, said conduit having an enlarged discharge nozzle arranged in said housing and extending parallel to said screens substantially throughout the width of said housing;
   (h) means for controlling the flow of air from said discharge nozzle for regulating the flow of air at different parts of said nozzle transversely thereof to produce a substantially uniform deposit of fibers on each of said screens;
   (i) shielding means on the interior of said screening cylinders for controlling the deposit of fibers on the exterior surface of said screening cylinders, the portions of said cylindrical screens having fibers deposited thereon turning toward each other and pressing the fibers deposited on each cylinder against the fibers of the other cylinder to form a composite web;
   (j) means for carrying said web out of said housing; and
   (k) means for passing a hot gaseous medium through said web to plasticize said resin to bond the fibers of said web to each other.

2. Apparatus for forming a padding of fibrous materials comprising, in combination:
   (a) a housing having an entrance end and a discharge end;
   (b) means for feeding a predetermined mixture of loose fibrous materials and a dry finely divided resin into said housing adjacent said entrance end;
   (c) means for collecting said fibrous materials and resin and forming it into a web in which the resin is thoroughly intermingled with the fibrous materials;
   (d) means for producing a pressure adjacent said entrance end and a suction adjacent said discharge end to urge said fibres and resin at high velocity and with turbulence across said housing on to said collecting means;
   (e) means between said entrance end and said discharge end for assisting in impelling said fibers across said housing and simultaneously increasing the turbulent flow of said fibers;
   (f) means for discharging said web at the discharge end of said housing:
   (g) and means extending transversely of the chamber for controlling the flow of air at different points transversely of the chamber.

3. Apparatus in accordance with claim 2 which includes means for subjecting said web simultaneously to heat and pressure to melt the resin and cause it to coat said fibers and simultaneously form said fibers and resin into a pad of predetermined thickness and density.

4. Apparatus in accordance with claim 3 in which the heating temperature is not less than approximately 325° F.

5. Apparatus for forming a padding of fibrous materials comprising, in combination:
   (a) a housing having an entrance end and a discharge end;
   (b) means for feeding a predetermined mixture of loose fibrous materials and a dry finely divided resin into said housing and adjacent said entrance end;
   (c) means for collecting said fibrous materials and resin and forming it into a web in which the resin thoroughly intermingles with the fibrous materials;
   (d) means for producing a pressure adjacent said entrance end and a suction adjacent said discharge end to urge said fibers and resin at high velocity and with turbulence across said housing on to said collecting means;
   (e) means between said entrance end and said discharge end for assisting in impelling said fibers across said housing and simultaneously increasing the turbulent flow of said fibers and resins;
   (f) a pair of conveyors constituting part of a heating zone;
   (g) means for feeding said web from the discharge end of said housing to and through said conveyors, said conveyors being pervious to the flow of air and one of which is below and supports said web and the other of which is above said web and holds the web on the conveyor below and against the flow of air which would normally blow the web off the conveyor;
   (h) and means for rotating said collecting means and moving said conveyors through the heating zone at synchronized speeds.

6. A method of forming a web of fibrous materials on a pair of closely spaced rotating foraminous screens mounted in a chamber which comprises:
   (a) moving said fibrous material containing a dry, powdered resin to an entrance end and into said chamber containing said screens;
   (b) creating a suction interiorly of said screens to draw the fibrous material and resin onto the screens; and
   (c) projecting said fibrous material and said resin across said chamber by a flow of the air from adjacent the entrance end toward said screens, said flow of air and suction and the shape of the chamber being such that substantially homogeneous webs are formed on said screens, said chamber being under a higher differential in pressure than the pressure within the screens, the fibers being substantially dry and fluffy, the fibers and resin are light enough so that a turbulent action occurs in said chamber and at said screens to the end that the fibers and resin when in the webs are thoroughly intermingled and the fibers are laid in the web at random with a major portion of the fibers extending at angles to the surface of the web including a normal angle.

7. A method in accordance with claim 6 which includes:
(d) breaking up clumps of fibers adjacent entrance said end while impelling the individual fibers and resin toward said screens.

8. A method in accordance with claim 6 in which the flow of air through the chamber may be varied in pressure, volume and speed of flow adjacent said entrance end at various points transversely of the chamber.

9. A method of forming a web of material wherein the web of material is passed between a pair of closely spaced, foraminous screens mounted in a chamber which comprises:
(a) moving said fibrous material containing a dry, powdered resin to an entrance end and into and across said chamber toward said screens with turbulent flow;
(b) creating a reduced pressure interiorly of said screens to draw the fibrous material and resin onto the screens;
(c) pressing the web formed on each of said screens into a single, substantially homogeneous web of fibrous material and resin;
(d) passing the web of material through a heating zone;
(e) applying heat and pressure to said single web to cause the resin to melt and flow to bind the fibers together; and
(f) controlling the lineal speed of the single web so that it is a constant from the time it is formed until it passes through said heating zone.

10. A method in accordance with claim 9 in which the heating medium is a gas heated to a temperature above that at which the dry resinous materials will melt and flow, and above the temperature at which the fibers will char if exposed to the heated gas for any appreciable length of time, the web being moved through the heating zone at a speed increasing as the inlet temperature of the gas increases so the fibers will not char.

11. A method in accordance with claim 10 in which the temperature of the gas is not less than approximately 325° F.

12. A web-forming apparatus including, in combination:
(a) a housing into which fibers of which the web to be formed are admitted;
(b) a distributing cylinder having projections thereon to separate clumps of the fibers into individual fibers which throw the fibers at random through said housing, said distributing cylinder being located wholly within said housing and exerting said separating action without appreciably cutting the fibers;
(c) a pair of cylindrical rotary screens in said housing against which the fibers are directed by said distributing cylinder;
(d) means for individually withdrawing air from the interior of said screens and directing air into said housing to carry fibers in said housing to said screens, said screens positioning the fibers deposited thereon together to form a web;
(e) a conveyor on which said web is deposited for removal from said housing;
(f) and shielding means adjacent said screens and adjustable in a circumferential direction with respect to said screens so that the adjacent edges of the shielding means may be shifted to various points upstream from a line joining the axes of said cylinders.

13. Apparatus in accordance with claim 12 including means in close proximity to said screens for shielding said screens, said means being adjustable to control the areas of the screens on which the fibers are deposited and so that the adjacent edges of the shielding means may be shifted to various points upstream from a line joining the axes of said cylinders.

14. A web forming apparatus including:
(a) a housing into which the fibers of which the web is to be formed are admitted;
(b) a distributing cylinder which separates clumps of the fibers into individual fibers and throws the fibers at random through said housing;
(c) a pair of cylindrical rotary screens in said housing against which the fibers are directed by said distributing cylinder;
(d) means for individually withdrawing air from the interior of said screens and directing air into said housing to carry fibers in said housing to said screens, said screens positioning the fibers deposited thereon together to form a web;
(e) a conveyor on which said web is deposited for removal from said housing; and
(f) means for controlling the speed of rotation of said screens to control the thickness of the layers of fibers deposited on said screen cylinders and shielding means adjacent said screens and adjustable in a circumferential direction with respect to said screens so that the adjacent edges of the shielding means may be shifted to various points upstream from a line joining the axes of said cylinders.

15. Apparatus in accordance with claim 14 wherein means are provided for intermingling resin with said fibers to bond the fibers together upon the application of heat.

16. A web forming apparatus including:
(a) a housing into which the fibers of which the web is to be formed are admitted;
(b) a pair of cylindrical rotating screens in said housing against which the fibers are directed;
(c) means for individually withdrawing air from the interior of said screens and directing air into said housing to carry said fibes in said housing onto said screens, said screens positioning the fibers deposited thereon together to form a single web;
(d) a plurality of dampers positioned at intervals transversely of said housing; and
(e) means for adjusting said dampers independently of each other to control the deposit of fibers transversely of the screen.

17. A web forming apparatus including:
(a) a housing into which the fibers of which the web is to be formed are admitted and mixed with a resin;
(b) means in said housing for separating the fibers from each other and throwing them at random through said housing;
(c) a pair of cylindrical rotary screens in said housing against which the fibers are directed and on which layers of said fibers are deposited, said screens being rotated to press together the fibers deposited on both screens to form a web;
(d) a heating apparatus into which said web is passed;
(e) means in said heating apparatus for flowing a heated gaseous medium through said web to convert said resin into a plastic material bonding said fibers together; and
(f) means for controlling the speed of rotation of said screens and the speed of passage of said web through said heating apparatus so that said speeds may be synchronized.

References Cited

UNITED STATES PATENTS

| | | | |
|---|---|---|---|
| 1,990,554 | 2/1935 | Libberton | 156—376 XR |
| 2,152,901 | 4/1939 | Manning | 264—112 |
| 2,188,373 | 1/1940 | Pearce | 156—62.4 XR |
| 2,357,042 | 4/1941 | Coss et al. | 156—376 XR |
| 2,927,621 | 3/1960 | Slayter | 156—376 XR |

FOREIGN PATENTS

| | | |
|---|---|---|
| 62,776 | 1/1913 | Switzerland. |

EARL M. BERGERT, *Primary Examiner.*

W. E. HOAG, *Assistant Examiner.*